United States Patent
Liu et al.

(10) Patent No.: US 12,499,588 B2
(45) Date of Patent: Dec. 16, 2025

(54) IMAGE PROCESSING METHOD AND DEVICE, AND STORAGE MEDIUM

(71) Applicant: Beijing Xiaomi Mobile Software Co., Ltd., Beijing (CN)

(72) Inventors: Mengfei Liu, Beijing (CN); Yang Sun, Beijing (CN); Miao Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 169 days.

(21) Appl. No.: 18/091,021

(22) Filed: Dec. 29, 2022

(65) Prior Publication Data
US 2024/0054691 A1 Feb. 15, 2024

(30) Foreign Application Priority Data
Aug. 10, 2022 (CN) .......................... 202210957723.5

(51) Int. Cl.
*G06T 11/00* (2006.01)
*G06F 3/04842* (2022.01)
*G06T 9/00* (2006.01)
*G06V 40/16* (2022.01)

(52) U.S. Cl.
CPC .......... *G06T 11/00* (2013.01); *G06F 3/04842* (2013.01); *G06T 9/002* (2013.01); *G06V 40/16* (2022.01); *G06T 2200/24* (2013.01); *G06T 2210/22* (2013.01)

(58) Field of Classification Search
CPC ..... G06T 11/00; G06T 9/002; G06T 2200/24; G06T 2210/22; G06V 40/16; G06F 3/04842

USPC .......................................................... 345/626
See application file for complete search history.

(56) References Cited

U.S. PATENT DOCUMENTS

| | | | |
|---|---|---|---|
| 2009/0027337 A1* | 1/2009 | Hildreth | G06F 3/03 345/158 |
| 2019/0109981 A1* | 4/2019 | Zhang | H04N 23/64 |
| 2022/0038621 A1* | 2/2022 | Lee | H04N 23/80 |

FOREIGN PATENT DOCUMENTS

| | | |
|---|---|---|
| CN | 113709386 A | 11/2021 |
| WO | 2021/185296 A1 | 9/2021 |

OTHER PUBLICATIONS

Luo, "A Novel Method for Detecting Cropped and Recompressed Image Block", 2007 (Year 2007), IEEE ICASSP 2007, pp. 217-220 (Year 2007).*

Extended European Search Report issued on Aug. 22, 2023 for European Patent Application No. 22217145.6.

* cited by examiner

*Primary Examiner* — Hai Tao Sun
(74) *Attorney, Agent, or Firm* — Volpe Koenig

(57) ABSTRACT

An image processing method, the method includes: obtaining a compressed image of a current image, where resolution of the current image is greater than that of the compressed image; cropping out at least one composition preview image based on the compressed image; and in response to selecting a target composition image from said at least one composition preview image displayed, cropping the current image based on a cropping range indicated by the target composition image.

19 Claims, 11 Drawing Sheets

IMAGE PROCESSING METHOD AND DEVICE, AND STORAGE MEDIUM

CROSS REFERENCE TO RELATED APPLICATIONS

The present application claims the benefit of priority to Chinese Application No. 202210957723.5 filed on Aug. 10, 2022, the contents of which are incorporated herein by reference in their entireties for all purposes.

BACKGROUND ART

With the development of terminal technologies and the progress of a multimedia era, the demands of users for obtaining images by using terminal devices become more and more. In the related art, if the users are not satisfied with the composition of the shot images after shooting images, the users need to crop the shot images manually, so as to make presenting positions of body images in the cropped images more reasonable.

SUMMARY

The embodiments of the present disclosure provide an image processing method and a device, and a storage medium.

According to a first aspect of an embodiment of the present disclosure, there is provided an image processing method, the method including:
  obtaining a compressed image of a current image, where resolution of the current image is greater than that of the compressed image;
  cropping out at least one composition preview image based on the compressed image; and
  cropping, in response to selecting a target composition image from said at least one composition preview image displayed, the current image based on a cropping range indicated by the target composition image.

According to a second aspect of an embodiment of the present disclosure, there is provided an electronic device, the electronic device including:
  a processor, and a memory configured to store a computer program;
  where when executing the computer program, the processor is configured to implement:
  obtaining a compressed image of a current image, where resolution of the current image is greater than that of the compressed image;
  cropping out at least one composition preview image based on the compressed image; and
  cropping, in response to selecting a target composition image from the displayed at least one composition preview image, the current image based on a cropping range of the target composition image.

According to a third aspect of an embodiment of the present disclosure, there is provided a non-transitory computer-readable storage medium storing a computer program, where when executed by a processor, the program implements:
  obtaining a compressed image of a current image, where resolution of the current image is greater than that of the compressed image;
  cropping out at least one composition preview image based on the compressed image; and
  cropping, in response to selecting a target composition image from said at least one composition preview image displayed, the current image based on a cropping range indicated by the target composition image.

It shall be understood that the above general description and the following detailed description are only exemplary and explanatory, and cannot limit the present disclosure.

BRIEF DESCRIPTION OF THE FIGURES

The accompanying drawings, which are incorporated in and constitute a part of this specification, illustrate the embodiments consistent with the present disclosure and, together with the specification, serve to explain the principles of the disclosure.

DETAILED DESCRIPTION OF THE EMBODIMENTS

Exemplary examples will be described in detail here, and examples thereof are shown in the accompanying drawings. When the following descriptions refer to the drawings, the same numbers in different drawings indicate the same or similar elements, unless otherwise indicated. The embodiments described in the following examples do not represent all embodiments consistent with the present disclosure. Instead, they are merely examples of apparatuses and methods consistent with some aspects of the present disclosure described as detailed in the appended claims.

The disclosure relates to the field of image processing technologies, and in particular to an image processing method and a device, and a storage medium.

In the related art, if the users are not satisfied with the composition of the shot images after shooting images, the users need to crop the shot images manually, so as to make presenting positions of body images in the cropped images more reasonable. However, such a processing manner may consume more manpower and time and has low processing efficiency, which cannot meet the demands of the users.

In order to overcome the problems existing in the related art, the embodiments of the present disclosure provide an image processing method and a device, and a storage medium.

Figure 1:
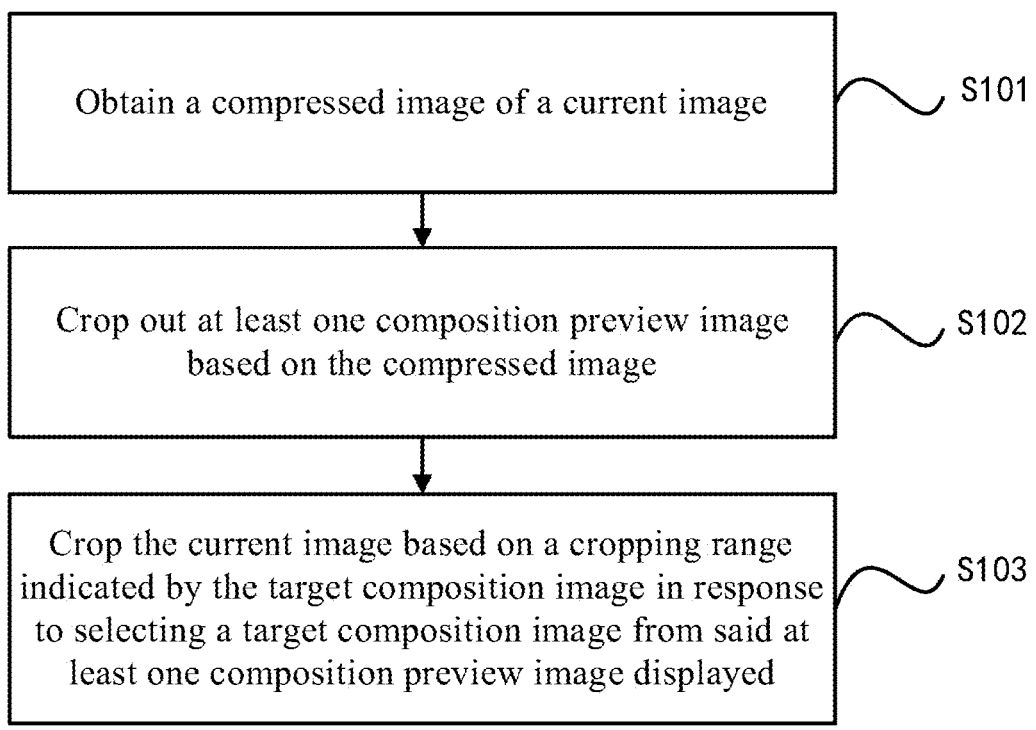
FIG. 1 is a flowchart of an image processing method according to an example of the present disclosure.

FIG. 1 is a flowchart of an image processing method according to an example of the present disclosure; The method of this embodiment may be applied to a terminal device (e.g., a smart phone, a tablet, a camera, a wearable device, etc.) having an image processing function.

As shown in FIG. 1, the method includes the following steps S101 to S103.

In step S101, a compressed image of a current image is obtained.

In this embodiment, when the terminal device displays the current image, the compressed image of the current image may be obtained. Specifically, whether the current image meets an image processing condition may be judged, so as to obtain the compressed image of the current image when the current image is judged to meet the image processing condition, where the resolution of the current image is greater than that of the compressed image. For example, the current image may be an ultra high definition image with 100 million pixels and other ultra high definition images, and thus, the resolution of the current image may be 12032× 9024; and the compressed image may be a high definition image with 12 million pixels, and thus, the resolution of the compressed image may be 4000×3000.

In some embodiments, the current image may be compressed by using a preset image compression algorithm, such that the compressed image is obtained. It is worth noting that the image compression algorithm may be selected from the related technologies based on actual service demands, which is not limited in this embodiment.

In some embodiments, a case of the current image meeting the image processing condition may include any one of the following (a) and (b):

(a): detecting an instruction for shooting the current image, for example, when a user shoots the current image based on a camera application on the terminal device, detecting that the user triggers the instruction for shooting the current image by pressing a shutter and other manners, etc.

(b): detecting a trigger operation for a preset composition function entrance, for example, when the user browses the current image by means of a large image browsing manner in a photo album application on the terminal device, detecting that the user triggers the trigger operation for the preset composition function entrance in a large image browsing page of the current image, etc., where the preset composition function entrance may be an interaction interface established based on the image processing function of this embodiment.

In some embodiments, the large image browsing manner refers to a way for the user to browse the original image of an image in the photo album application on a terminal device, such as clicking a compressed image in the photo album application to jump to a large image browsing page to browse the original image of the compressed image, or browsing the original image of an image in the photo album application by swiping left and right on the large image browsing page. Where, the large image browsing page is a page for displaying the original images of the images in the photo album application.

In step S102, at least one composition preview image is cropped out based on the compressed image.

In this embodiment, after the compressed image of the current image is obtained, the at least one composition preview image may be cropped out based on the compressed image.

In some embodiments, when the number of the cropped composition preview images is greater than 1, a composition manner of each composition preview image may be different. The composition manner may include at least one of an image scale of corresponding composition preview image and a position where a body image is located in the image.

It may be understood that the body image is a main shooting object, such as at least one of figures, buildings, animals, plants, scenery, constructions, and food.

Figure 2:
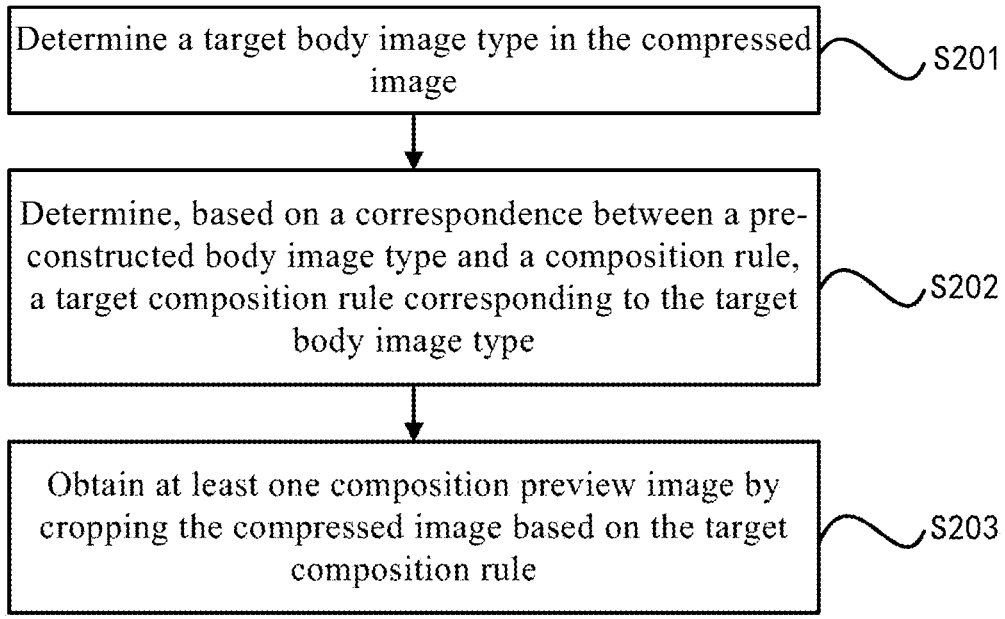
FIG. 2 is a flowchart of how to crop out at least one composition preview image based on a compressed image according to an example of the present disclosure.

In other embodiments, the above manner for cropping out the at least one composition preview image based on the compressed image may refer to the embodiment shown in FIG. 2, which is not described first in detail herein.

In step S103, in response to selecting a target composition image from said at least one composition preview image displayed, the current image is cropped based on a cropping range indicated by the target composition image.

In this embodiment, after the at least one composition preview image is cropped out based on the compressed image, the at least one composition preview image may be displayed on the terminal device for the user to select based on preferences of the user. Thus, when it is detected that the user selects the target composition image from the displayed at least one composition preview image (that is, a composition preview image that the user prefers), the current image may be cropped based on a cropping range of the target composition image. It may be understood that the cropping range is a region corresponding to the target composition image on the compressed image, and cropping the current image based on the cropping range may ensure that the composition manner of the cropped current image is the same as the composition manner of the target composition image, so as to meet the preferences of the user.

It can be known from the above description that, according to a method of the present disclosure, a compressed image of a current image is obtained, where the resolution of the current image is greater than that of the compressed image, and at least one composition preview image is cropped out based on the compressed image, such that in response to selecting a target composition image from the displayed at least one composition preview image, the current image is cropped based on a cropping range of the target composition image, which may implement automatic cropping of the current image, save manpower and time of a user, and improve image processing efficiency. The at least one composition preview image is displayed for the user to select the target composition image, such that it may be ensured that a composition manner of the selected target composition image conforms to the demands of the user. A cropping preview image of the compressed image of the current image is obtained to be displayed for the user, and the current image is cropped after the user selects the target composition image, such that a system memory for performing an image processing algorithm of the embodiments may be saved, so as to lower demands for system performance.

FIG. 2 is a flowchart of how to crop out at least one composition preview image based on a compressed image according to an example of the present disclosure. This embodiment takes how to crop out the at least one composition preview image based on the compressed image as an example to give an exemplary description. As shown in FIG. 2, the at least one composition preview image being cropped out based on the compressed image described in the above step S102 may include the following steps S201 to S203.

In step S201, a target body image type in the compressed image is determined.

In this embodiment, after the compressed image of the current image is obtained, the target body image type in the compressed image may be determined.

It is worth noting that a body image type is a type of a main shooting object in the image. In some embodiments, the body image type may be divided into a portrait type and a non-portrait type, where the non-portrait type may further be divided into at least one of the following non-portrait subtypes: animals, plants, scenery, constructions, and food.

In this embodiment, the target body image type in the compressed image may be recognized based on a preset image recognition algorithm, and/or, the target body image type in the compressed image may be determined based on pre-obtained label information of the current image. For example, the pre-obtained label information may include at least one of a face detection result of the current image and an artificial intelligence scenario detection result.

For example, if the face detection result is "having a face", it may be determined that the target body image type in the compressed image is the portrait type. Based on this, the number of portraits (human bodies or faces) in the image may further be detected, and which portrait subtype of the target body image type is in single-person subtype, double-person subtype, and multi-person subtype may be determined.

If the face detection result is "having no face", it may be determined that the target body image type in the compressed image is the non-portrait type. Based on this, which non-portrait subtype of the target body image type is in animals, plants, scenery, and food may be further determined in combination with the artificial intelligence scenario detection result. The content of the artificial intelligence scenario detection result may include an animal scenario, a plant scenario, a scenery scenario, a food scenario, etc.

In step S202, a target composition rule corresponding to the target body image type is determined based on a correspondence between a pre-constructed body image type and a composition rule.

In this embodiment, after the target body image type in the compressed image is determined, the target composition rule corresponding to the target body image type may be determined based on the correspondence between the pre-constructed body image type and the composition rule.

For example, a proper construction rule may be formulated based on aesthetic semantics and body features of different body image types in advance, so as to establish a correspondence between the body image type and the composition rule, such that after the target body image type in the compressed image of the current image may be determined, a target composition rule corresponding to the target body image type may be searched based on the correspondence.

In some embodiments, the target composition rule described above may include at least one of the following 1) to 4):

1) a preset image scale of the composition preview image, for example, 4:3, 3:4, 16:9, 9:16, etc.
2) a distribution principle of the body image in the composition preview image, the distribution principle including at least one of the following (a) to (e):
   (a) a distribution principle based on an image median line, for example: making a position of the body of the image close to the image median line preferentially.
   (b) a distribution principle based on an image trisection line, for example: making a position of the body of the image close to the closest image trisection line preferentially.
   (c) a distribution principle based on a preset image quality point, for example: making a position of the body of the image cover the maximum image quality points preferentially, where the image quality point may be a focus of the image median line and/or the image trisection line.
   (d) a distribution principle based on a preset image inner frame region, for example: making a position of the body of the image located in the image inner frame region preferentially, where the image inner frame region may be a minimum wrapped rectangle of the image quality point, etc.
   (e) a principle for setting an edge or an outer frame around the body image, for example: leaving an edge or outer frame of a certain size around the body of the image preferentially.
3) a cropping circumvention principle of the body image in the composition preview image, where the cropping circumvention principle may include circumventing at least one of a face, four limbs, and a specific joint (e.g., a neck, a wrist, an elbow, a waist, a knee, an ankle, etc.) of a portrait and/or a pet when cropping an edge of the image.
4) an inclination angle correction principle of the body image in the composition preview image, that is, a horizontal line (a horizon) correction algorithm may be used for the image of the non-portrait type, and when it is detected that an inclination angle of the body of the image is less than or equal to an angle threshold (e.g., 20°, etc.), the inclination angle may be corrected to a horizontal line or a vertical line. It is worth noting that a correction manner of the inclination angle may be selected based on actual demands, and if a correction manner based on a gyroscope or other manners is selected (that is, gyroscope data of a terminal device is obtained when shooting the image, so as to correct the inclination angle based on the gyroscope data during subsequent image processing), which is not limited in the embodiment.

In step S203, at least one composition preview image is obtained by cropping the compressed image based on the target composition rule.

In this embodiment, after the target composition rule corresponding to the target body image type is determined based on the correspondence between the pre-constructed body image type and the composition rule, at least one composition preview image is obtained by cropping the compressed image based on the target composition rule.

In some embodiments, the above at least one composition preview image may respectively correspond to one preset image scale, for example, respectively cropping out the composition preview image in preset image scales of 4:3, 3:4, 16:9, and 9:16.

It can be known from the above description that, according to this embodiment, a target body image type in the compressed image is determined, and a target composition rule corresponding to the target body image type is determined based on a correspondence between a pre-constructed body image type and a composition rule, such that at least one composition preview image is obtained by cropping the compressed image based on the target composition rule, which may implement that the at least one composition preview image is cropped out in high quality based on the compressed image, so as to implement that a current image is cropped based on a cropping range of the target composition image selected by a user from the at least one composition preview image subsequently, save manpower and time of the user, and improve image processing efficiency.

In some other embodiments, in response to determining that the at least one composition preview image needs to be cropped out based on the compressed image, the compressed image may further be input to a pre-trained composition preview image generation model to obtain the at least one composition preview image. The input of the composition preview image generation model is the compressed image, and the output is the at least one composition preview image cropped out based on the compressed image.

Figure 3:
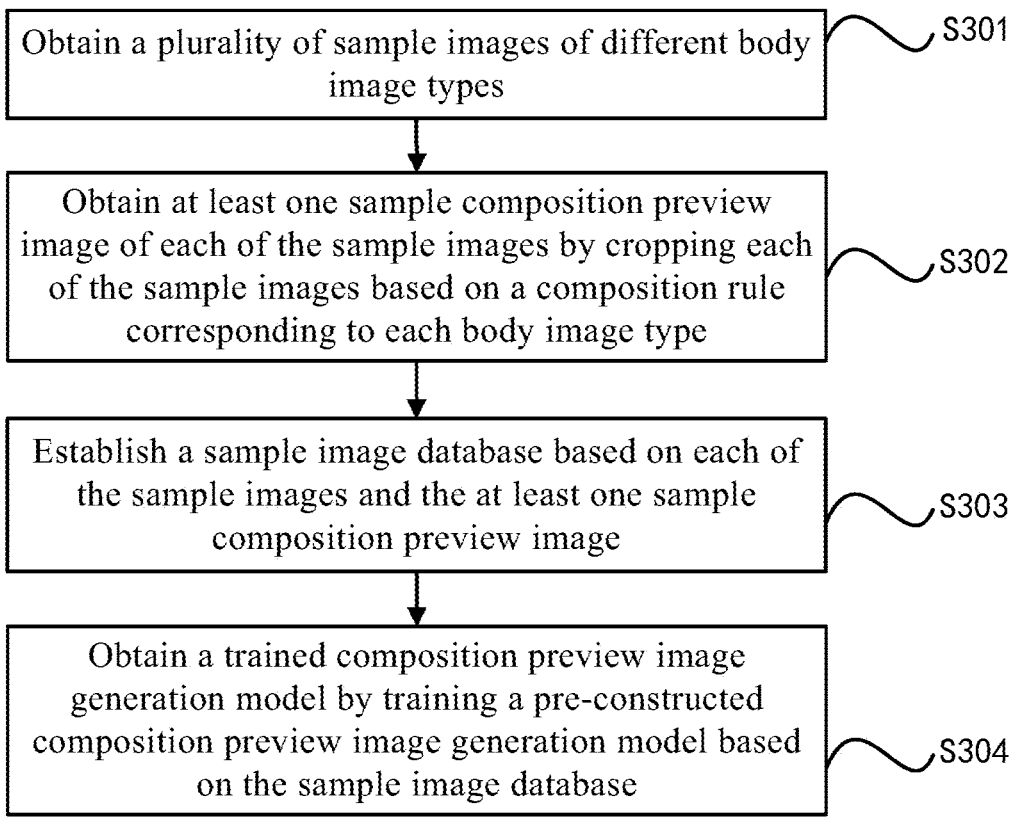
FIG. 3 is a flowchart of how to train a composition preview image generation model according to an example of the present disclosure.

For example, FIG. 3 is a flowchart of how to train a composition preview image generation model according to an example of the present disclosure. As shown in FIG. 3, the image processing method of the embodiment may further include training the composition preview image generation model based on the following steps S301 to S304.

In step S301, a plurality of sample images of different body image types is obtained.

In this embodiment, the plurality of sample images may be obtained in advance, and the plurality of sample images of different body image types is obtained by marking the body image type of each compressed image in a manual or automatic manner. It is worth noting that the above sample image may be an image obtained in any image processing manner, or may be an image frame in a video.

The body image type may include a portrait type and a non-portrait type;
  the portrait type further includes a portrait subtype, wherein the portrait subtype is at least one of: single-person, double-person, or multi-person; and
  the non-portrait type further includes a non-portrait subtype, wherein the non-portrait subtype is at least one of: animals, plants, scenery, constructions, or food.

In step S302, at least one sample composition preview image of each of the sample images is obtained by cropping each of the sample images based on a composition rule corresponding to each body image type.

In this embodiment, after the plurality of sample images of different body image types are obtained, the at least one sample composition preview image of each of the sample images is obtained by cropping each of the sample images based on the pre-determined composition rule corresponding to each body image type,
  where the composition rule corresponding to the body image type may include at least one of the following 1) to 4):
  1) a preset image scale of the composition preview image, for example, 4:3, 3:4, 16:9, 9:16, etc.
  2) a distribution principle of the body image in the composition preview image, the distribution principle including at least one of the following (a) to (e):
    (a) a distribution principle based on an image median line;
    (b) a distribution principle based on an image trisection line;
    (c) a distribution principle based on a preset image quality point;
    (d) a distribution principle based on a preset image inner frame region; and
    (e) a principle for setting an edge or an outer frame around the body image.
  3) a cropping circumvention principle of the body image in the composition preview image, where the cropping circumvention principle may include circumventing at least one of a face, four limbs, and a specific joint of a portrait and/or a pet when cropping an edge of the image.
  4) an inclination angle correction principle of the body image in the composition preview image.

In step S303, a sample image database is established based on each of the sample images and the at least one sample composition preview image.

In this embodiment, after the at least one sample composition preview image of each of the sample images is obtained, one training sample may be obtained based on each of the sample images and the at least one sample composition preview image, such that the sample image database is established based on each training sample for subsequent training of the composition preview image generation model.

In step S304, a trained composition preview image generation model is obtained by training a pre-constructed composition preview image generation model based on the sample image database.

In this embodiment, after the sample image database is established based on each of the sample images and the at least one sample composition preview image, the pre-constructed composition preview image generation model may be trained based on the sample image database, and the trained composition preview image generation model is obtained by stopping the training of the model when a training cut-off condition is met. For example, the above composition preview image generation model may use a neural network model based on deep learning, and this embodiment does not limit a specific model type.

It can be known from the above description that, according to this embodiment, a plurality of sample images of different body image types are obtained, each of the sample images is cropped based on a composition rule corresponding to each body image type to obtain at least one sample composition preview image of each of the sample images, and then a sample image database is established based on each of the sample images and the at least one sample composition preview image, such that a pre-constructed composition preview image generation model is trained based on the sample image database to obtain a trained composition preview image generation model, which may implement that the composition preview image generation model is accurately trained, so as to implement that a compressed image of a current image is processed based on the trained composition preview image generation model to obtain the at least one composition preview image, which can improve quality and efficiency of generating the at least one composition preview image.

The composition rules of the embodiments of the present disclosure are introduced by some specific examples in the following.

Figure 4A:
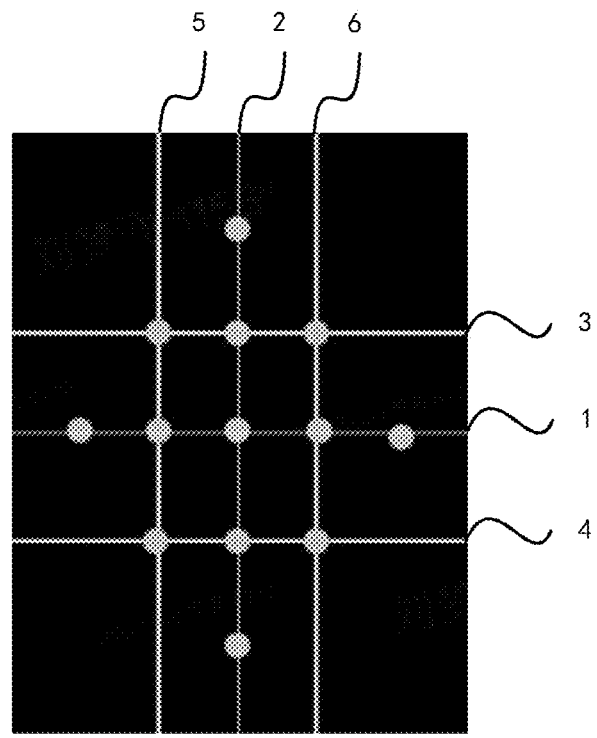
FIG. 4A is a schematic diagram of an image median line, an image trisection line, and an image quality point according to an example of the present disclosure.
Figure 4B:
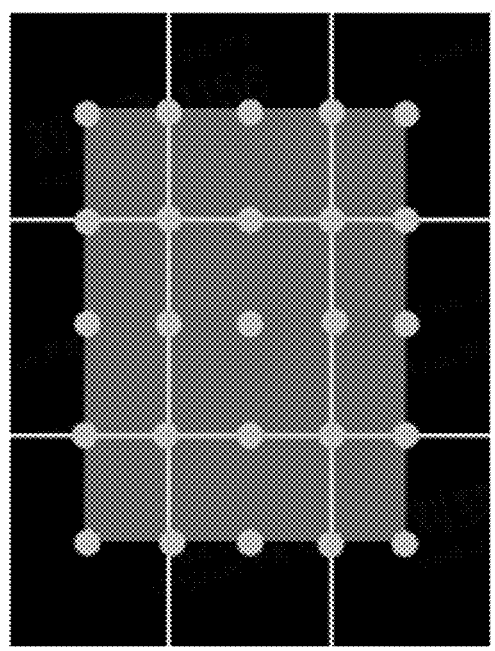
FIG. 4B is a schematic diagram of an image inner frame region according to an example of the present disclosure.
Figure 4C:
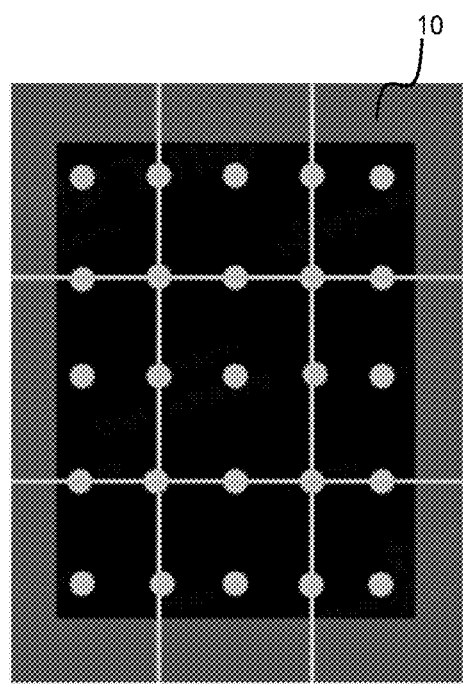
FIG. 4C is a schematic diagram of an edge or an outer frame around a body image according to an example of the present disclosure.

FIG. 4A is a schematic diagram of an image median line, an image trisection line, and an image quality point according to an example of the present disclosure; FIG. 4B is a schematic diagram of an image inner frame region according to an example of the present disclosure; and FIG. 4C is a schematic diagram of an edge or an outer frame around a body image according to an example of the present disclosure.

A cross line is composed of a straight line 1 and a straight line 2 in FIG. 4A is the image median line, and the median line may be used for a reference line of centering composition. Straight lines 3 to 6 in FIG. 4A are the image trisection lines, and the trisection lines may be used for a reference line of trisection composition. Each point in FIG. 4A is the image quality point.

At least one of the image median lines, the image trisection line, and the image quality point may be used to adjust a position of a body image in a cropped composition preview image.

A minimum wrapped rectangle of the quality point in FIG. 4B is the image inner frame region, and a position of a body of the image is in the image's inner frame region preferentially when cropping composition is performed on the compressed image.

A side frame region in FIG. 4C is the edge or outer frame around the body image, and the edge or outer frame of a certain size is left around the body of the image preferentially when the cropping composition is performed on the compressed image.

Figure 5A:
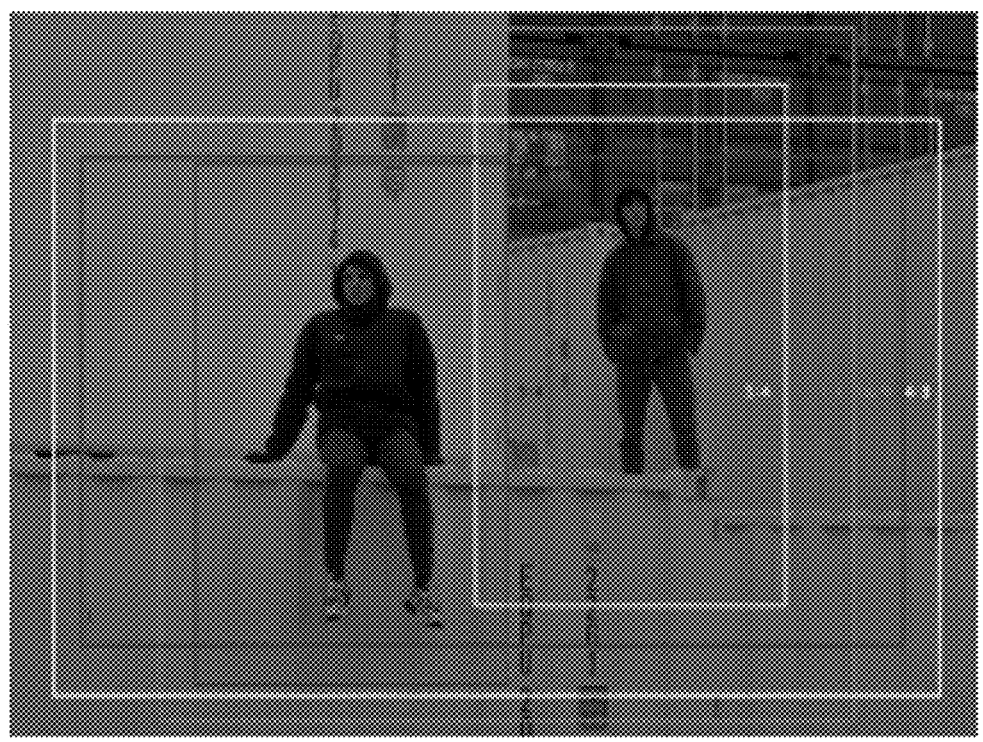
FIG. 5A is a schematic diagram of an original image of a portrait type according to an example of the present disclosure.
Figure 5B:
FIG. 5B is a schematic diagram of a composition rule of a double-person image in a 1:1 scale according to an example of the present disclosure.
Figure 5C:
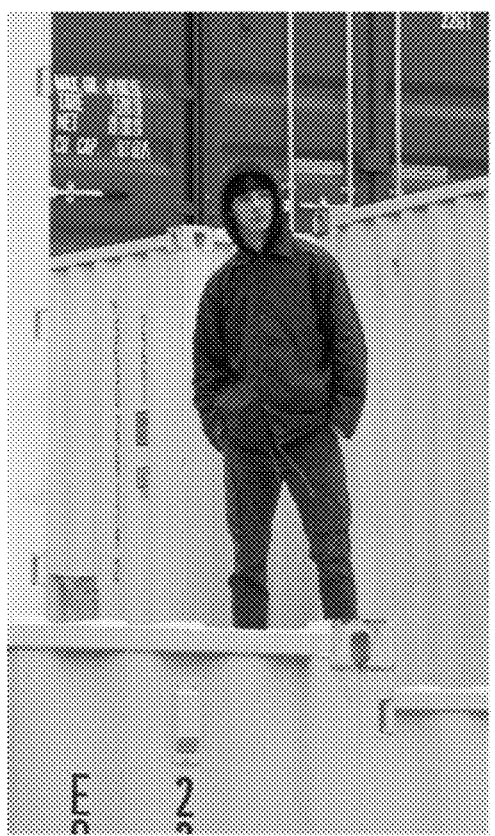
FIG. 5C is a schematic diagram of a composition rule of a single-person image in a 3:4 scale according to an example of the present disclosure.
Figure 5D:
FIG. 5D is a schematic diagram of a composition rule of a single-person image in a 3:4 scale according to another example of the present disclosure.
Figure 5E:
FIG. 5E is a schematic diagram of a composition rule of a double-person image in a 4:3 scale according to an example of the present disclosure.
Figure 5F:
FIG. 5F is a schematic diagram of a composition rule of a double-person image in a 16:9 scale according to an example of the present disclosure.

FIG. 5A is a schematic diagram of an original image of a portrait type according to an example of the present disclosure (cropping ranges of composition preview images of various scales are included in the figure); FIG. 5B is a schematic diagram of a composition rule of a double-person image in a 1:1 scale according to an example of the present disclosure; FIG. 5C is a schematic diagram of a composition rule of a single-person image in a 3:4 scale according to an example of the present disclosure; FIG. 5D is a schematic diagram of a composition rule of a single-person image in a 3:4 scale according to another example of the present disclosure; FIG. 5E is a schematic diagram of a composition rule of a double-person image in a 4:3 scale according to an example of the present disclosure; and FIG. 5F is a schematic diagram of a composition rule of a double-person image in a 16:9 scale according to an example of the present disclosure.

As shown in FIGS. 5A to 5F, for a body image type of single-portrait, at least one of the following image composition rules may be set:
    a. the body of the character is moved to a quality point or a quality line of a picture;
    b. the body of the image is positioned to the quality point or quality line, which is the closest to the body during composition cropping;
    c. the body of a portrait is preferably set at a horizontal median line or an upper position which should not be too low; and
    d. the body of the portrait is kept as complete as possible, and a certain protection region (that is, an edge or outer frame) is left at a boundary of the image.

For a body image type of double-portrait, at least one of the following image composition rules may be set:
    a. a horizontal image scale (that is, 4:3, 16:9, etc.): faces are included in the picture, and a core of the picture is not deviated;
    b. a vertical image scale (that is, 3:4, 9:16, etc.): whether the faces are included in the picture is judged: if the faces can be included in the picture, cropping is performed and no deviation of the core of the picture is ensured; and if the faces cannot be included in the picture, the vertical image can crop out a composition preview image in a 3:4 scale, and one single-person image is cropped out by taking a character of the picture as the body of the image respectively; and
    c. a square scale (that is, 1:1): the same as the composition rule of the vertical image.

For a body image type of multi-portrait (not shown in figures), at least one of the following image composition rules may be set:
    a. a horizontal image scale (that is, 4:3, 16:9, etc.): faces are included in the picture, and a core of the picture is not deviated;
    b. a vertical image scale (that is, 3:4, 9:16, etc.): whether the faces are included in the picture is judged: if the faces can be included in the picture, cropping is performed and no deviation of the core of the picture is ensured; and if the faces cannot be included in the picture, the vertical image is not given;
    c. five sense organs protection: the faces are not cropped as much as possible; and
    d. combination recommendation: a combination body is obtained by performing face convergence on a plurality of faces, such that the combination body is used as one body to be processed, and a processing rule is the same as the composition rule of the single-portrait.

Figure 6A:
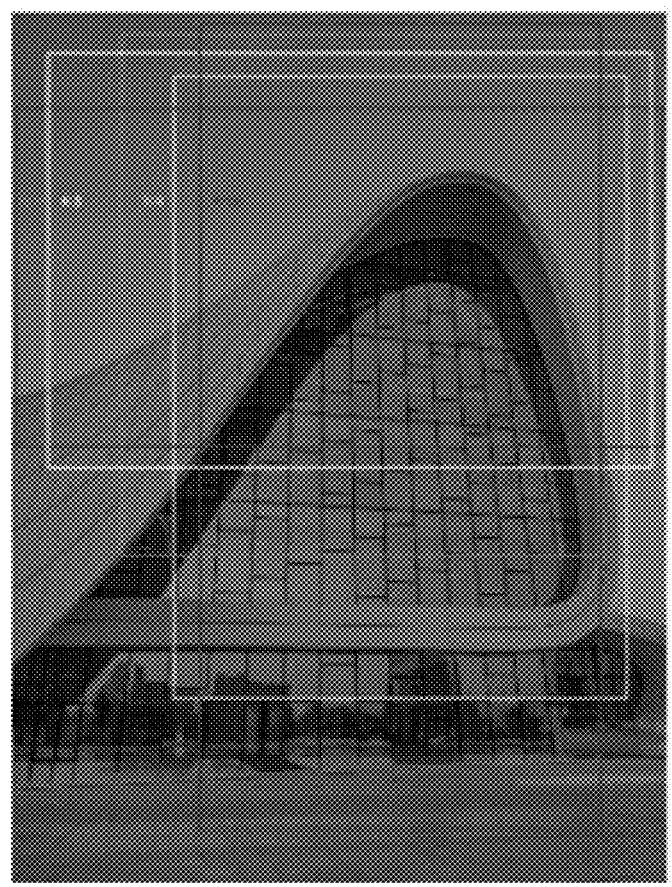
FIG. 6A is a schematic diagram of an original image of a construction type according to an example of the present disclosure.
Figure 6B:
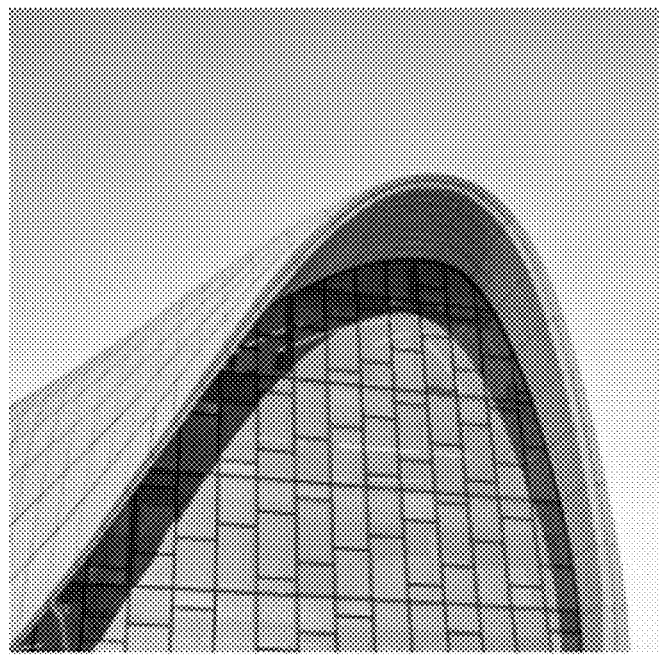
FIG. 6B is a schematic diagram of a composition rule of a construction image in a 1:1 scale according to an embodiment of the present disclosure.
Figure 6C:
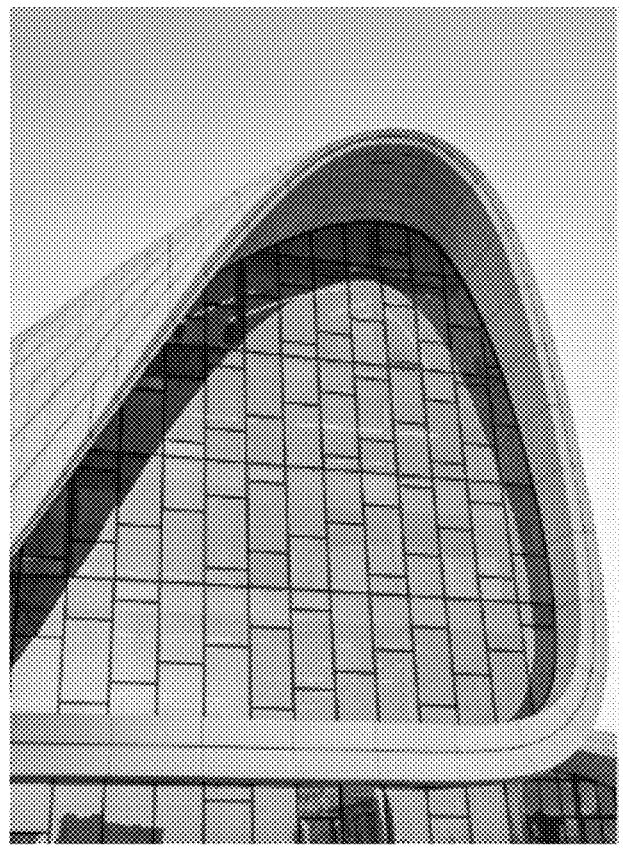
FIG. 6C is a schematic diagram of a composition rule of a construction image in a 3:4 scale according to an embodiment of the present disclosure.
Figure 6D:
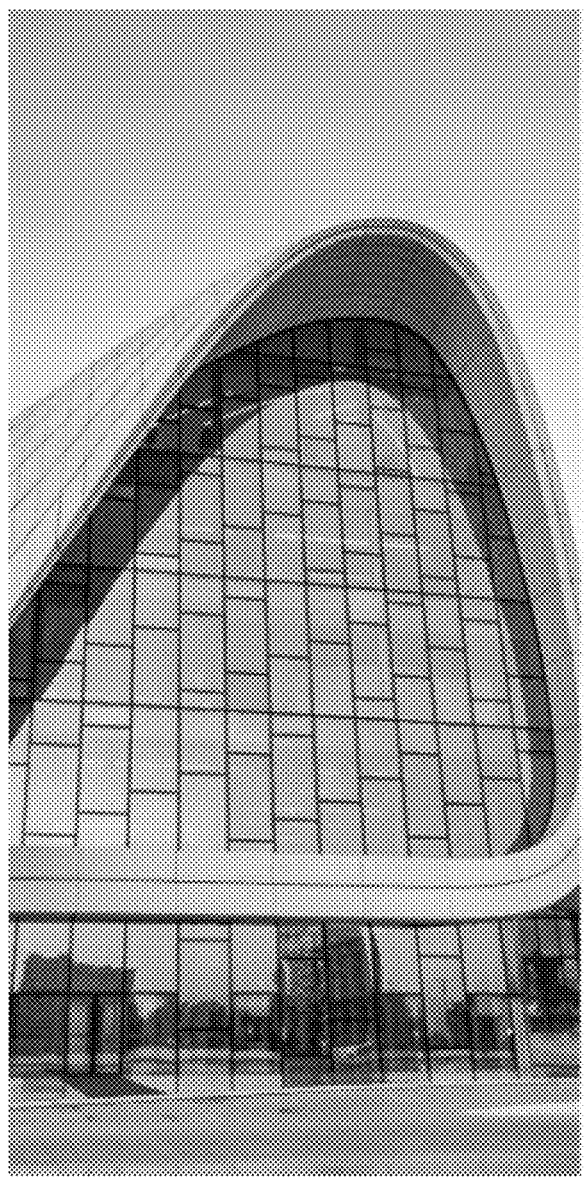
FIG. 6D is a schematic diagram of a composition rule of a construction image in a 9:16 scale according to an embodiment of the present disclosure.
Figure 6E:
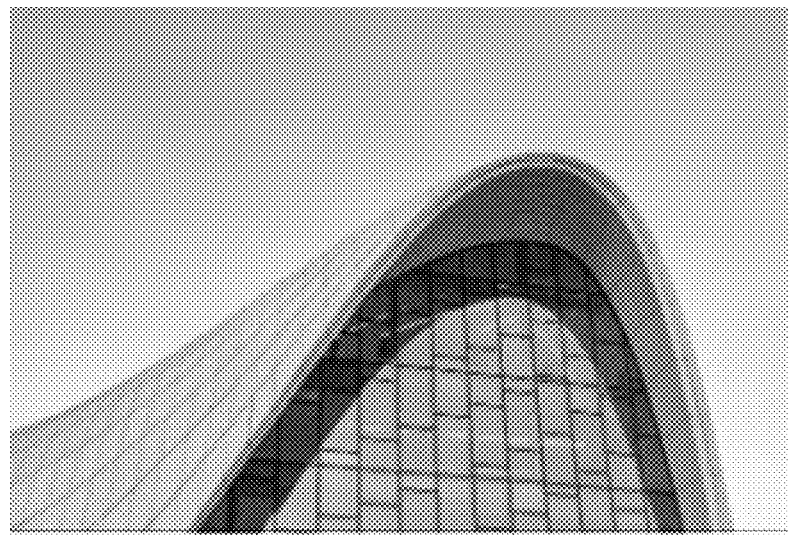
FIG. 6E is a schematic diagram of a composition rule of a construction image in a 4:3 scale according to an embodiment of the present disclosure.
Figure 6F:
FIG. 6F is a schematic diagram of a composition rule of a construction image in a 16:9 scale according to an embodiment of the present disclosure.

FIG. 6A is a schematic diagram of an original image of a construction type according to an example of the present disclosure (cropping ranges of composition preview images of various scales are included in the figure); FIG. 6B is a schematic diagram of a composition rule of a construction image in a 1:1 scale according to an example of the present disclosure; FIG. 6C is a schematic diagram of a composition rule of a construction image in a 3:4 scale according to an example of the present disclosure; FIG. 6D is a schematic diagram of a composition rule of a construction image in a 9:16 scale according to an example of the present disclosure; FIG. 6E is a schematic diagram of a composition rule of a construction image in a 4:3 scale according to an example of the present disclosure; and FIG. 6F is a schematic diagram of a composition rule of a construction image in a 16:9 scale according to an example of the present disclosure.

As shown in FIGS. 6A to 6F, for a body image type of the construction type, at least one of the following image composition rules may be set:
    a. a composition scale: 1:1, 4:3, 3:4, 16:9, and 9:16;
    b. the body of a construction is positioned to the quality point or quality line which is the closest to the body of the construction during composition cropping;

c. if the body of the construction is recognized to have obvious features, a composition edge cannot crop half of the body as much as possible; and d. an image of a non-portrait type uses a horizontal line (a horizon) correction algorithm preferably, that is, a horizontal-line (a horizon) correction algorithm may be used for the image of the non-portrait type, and when it is detected that an inclination angle of the body of the image is less than or equal to an angle threshold (e.g., 20°, etc.), the inclination angle may be corrected to a horizontal line or a vertical line.

Figure 7:
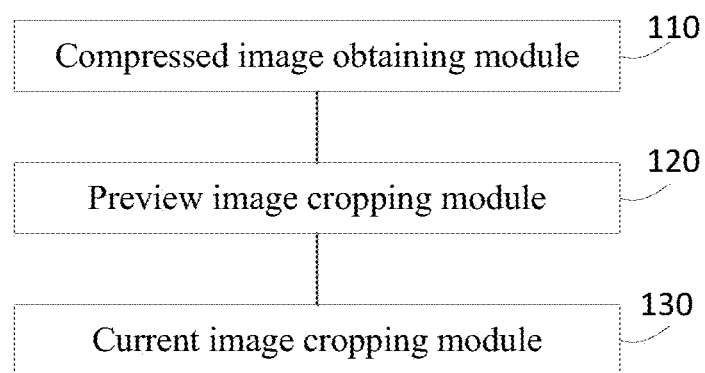
FIG. 7 is a block diagram of an image processing apparatus according to an example of the present disclosure.

FIG. 7 is a block diagram of an image processing apparatus according to an example of the present disclosure, and the apparatus of this embodiment may be applied to a terminal device having an image processing function (e.g., a smart phone, a tablet, a camera, a wearable device, etc.).

As shown in FIG. 7, the image processing apparatus includes: a compressed image obtaining module 110, a preview image cropping module 120, and a current image cropping module 130, where a compressed image obtaining module 110, configured to obtain a compressed image of a current image, where the resolution of the current image is greater than that of the compressed image;

a preview image cropping module 120, configured to crop out at least one composition preview image based on the compressed image; and a current image cropping module 130, configured to crop, in response to selecting a target composition image from said at least one composition preview image displayed, the current image based on a cropping range indicated by the target composition image.

It can be known from the above description that, according to the image processing apparatus of the present disclosure, a compressed image of a current image is obtained, where the resolution of the current image is greater than that of the compressed image, and at least one composition preview image is cropped out based on the compressed image, such that in response to selecting a target composition image from the displayed at least one composition preview image, the current image is cropped based on a cropping range of the target composition image, which may implement automatic cropping of the current image, save manpower and time of a user, and improve image processing efficiency. The at least one composition preview image is displayed for the user to select the target composition image, such that it may be ensured that a composition manner of the selected target composition image conforms to the demands of the user. A cropping preview image of the compressed image of the current image is obtained to be displayed for the user, and the current image is cropped after the user selects the target composition image, such that a system memory for performing an image processing algorithm of the embodiments may be saved, so as to lower demands for system performance.

Figure 8:
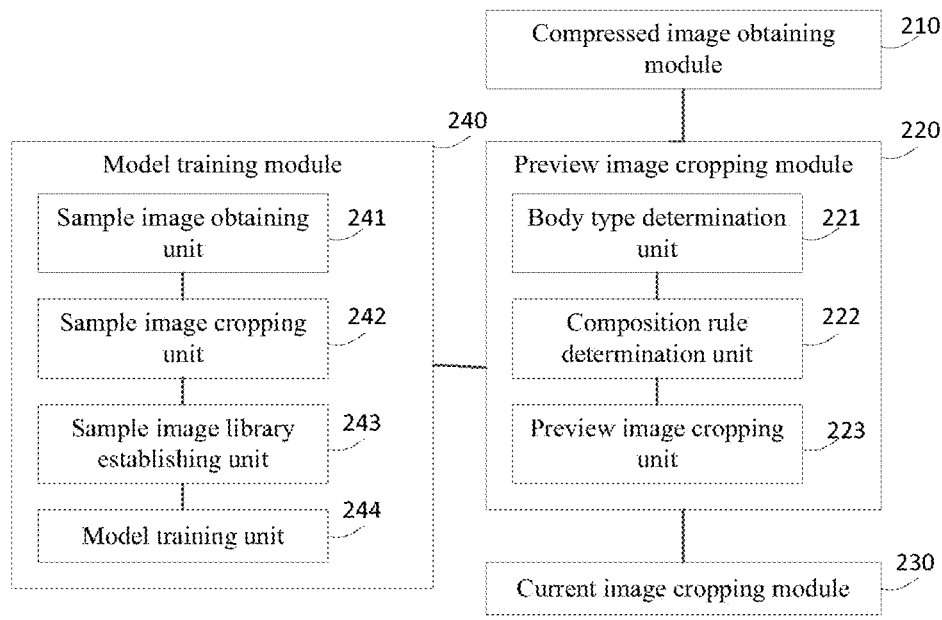
FIG. 8 is a block diagram of another image processing apparatus according to an example of the present disclosure.

FIG. 8 is a block diagram of another image processing apparatus according to an example of the present disclosure, and the image processing apparatus of this embodiment may be applied to a terminal device having an image processing function (e.g., a smart phone, a tablet, a camera, a wearable device, etc.). The functions of a compressed image obtaining module 210, a preview image cropping module 220, and a current image cropping module 230 are the same as that of the compressed image obtaining module 110, the preview image cropping module 120, and the current image cropping module 130 in the embodiment shown in the foregoing FIG. 7, which are not described in detail herein.

In this embodiment, the compressed image obtaining module 210 may further be configured to execute, in response to the current image meeting an image processing condition, an operation of obtaining the compressed image of the current image.

The current image meeting the image processing condition may include at least one of the following:

detecting an instruction for shooting the current image; and detecting a trigger operation for a preset composition function entrance, where the preset composition function entrance is located at a large image browsing page of the current image in a photo album application.

In some embodiments, as shown in FIG. 8, the preview image cropping module 220 may include:

a body type determination unit 221, configured to determine a target body image type in the compressed image;

a composition rule determination unit 222, configured to determine, based on a correspondence between a pre-constructed body image type and a composition rule, a target composition rule corresponding to the target body image type; and a preview image cropping unit 223, configured to obtain at least one composition preview image by cropping the compressed image based on the target composition rule.

In some embodiments, the body type determination unit 221 may further be configured to:

recognize the target body image type in the compressed image based on a preset image recognition algorithm; and/or, determining the target body image type in the compressed image based on pre-obtained label information of the current image, where the pre-obtained label information includes at least one of a face detection result of the current image and an artificial intelligence scenario detection result.

In some embodiments, the body image type may include a portrait type and a non-portrait type;

the portrait type further includes a portrait subtype, wherein the portrait subtype is at least one of: single-person, double-person, or multi-person; and the non-portrait type further includes a non-portrait subtype, wherein the non-portrait subtype is at least one of: animals, plants, scenery, constructions, or food.

In some embodiments, the target composition rule may include at least one of the following:

a preset image scale of the composition preview image;

a distribution principle of a body image in the composition preview image, where the distribution principle includes at least one of the following: a distribution principle based on an image median line, a distribution principle based on an image trisection line, a distribution principle based on a preset image quality point, a distribution principle based on a preset image inner frame region, and a principle for setting an edge or an outer frame around the body image;

a cropping circumvention principle of the body image in the composition preview image, where the cropping circumvention principle includes circumventing at least one of a face, four limbs, and a specific joint of a portrait and/or a pet when cropping an edge of the image; and an inclination angle correction principle of the body image in the composition preview image.

In some other embodiments, the preview image cropping module may further be configured to obtain the at least one composition preview image by inputting the compressed image to a pre-trained composition preview image generation model.

In some embodiments, the above image processing apparatus may further include a model training module 240; and
the model training module 240 may include the following:
a sample image obtaining unit 241, configured to obtain a plurality of sample images of different body image types;
a sample image cropping unit 242, configured to obtain at least one sample composition preview image of each of the sample images by cropping each of the sample images based on a composition rule corresponding to each body image type;
a sample image library establishment unit 243, configured to establish a sample image database based on each of the sample images and the at least one sample composition preview image; and
a model training unit 244, configured to obtain a trained composition preview image generation model by training a pre-constructed composition preview image generation model based on the sample image database, where the composition preview image generation model use a neural network model based on deep learning.

With regard to the apparatus in the above examples, the specific manners in which various modules perform operations have been described in detail in the examples relating to the methods, and details are not described herein.

Figure 9:
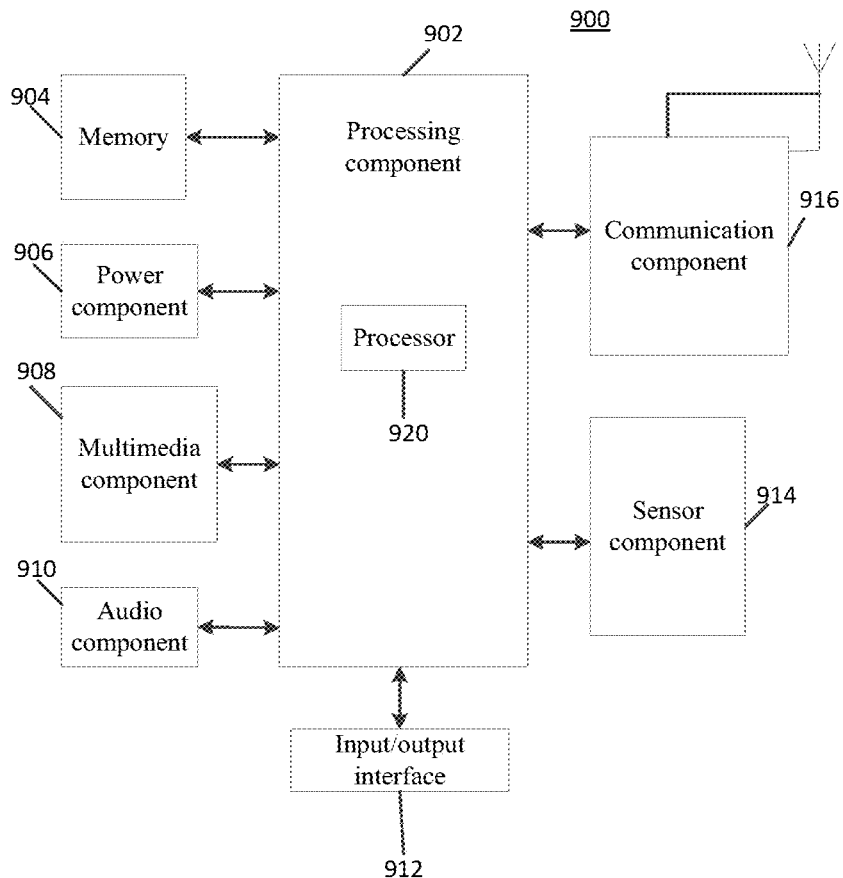
FIG. 9 is a block diagram of an electronic device according to an example of the present disclosure.

FIG. 9 is a block diagram of an electronic device according to an exemplary example. For example, the device 900 may be a mobile phone, a computer, a digital broadcasting terminal, a messaging device, a game console, a tablet device, a medical device, a fitness device, a personal digital assistant, etc.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 generally controls the overall operations of the device 900, such as operations associated with display, telephone calls, data communications, camera operations and recording operations. The processing component 902 may include one or more processors 920 to execute instructions to complete all of or part of the steps of the above method. In addition, the processing component 902 may include one or more modules to facilitate the interaction between the processing component 902 and other components. For example, the processing component 902 may include a multimedia module to facilitate interaction between the multimedia component 908 and the processing component 902.

The memory 904 is configured to store various types of data to support the operations at the device 900. Examples of these data include instructions for any application or method operated on the device 900, contact data, phone book data, messages, pictures, videos, etc. The memory 904 may be implemented by any type of volatile or non-volatile storage device or a combination of the volatile device and the non-volatile storage device, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 906 provides power to various components of the device 900. The power component 906 may include a power management system, one or more power sources, and other components associated with power generation, management and distribution of the device 900.

The multimedia component 908 includes a screen for providing an output interface between the device 900 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some embodiments, the multimedia component 908 includes a front camera and/or a rear camera. When the device 900 is in an operation mode, such as a shooting mode or a video mode, the front camera and/or the rear camera may receive external multimedia data. Each front or rear camera may be a fixed optical lens system or have a focal length and optical zoom capability.

The audio component 910 is configured to output and/or input an audio signal. For example, the audio component 910 includes a microphone (MIC), which is configured to receive external audio signals when the device 900 is in an operation mode, such as a call mode, a recording mode and a voice recognition mode. The received audio signal may be further stored in the memory 904 or sent by the communication component 916. In some embodiments, the audio component 910 further includes a speaker for outputting an audio signal.

The I/O interface 912 provides an interface between the processing component 902 and a peripheral interface module. The peripheral interface module may be a keyboard, a click wheel, buttons, etc. These buttons may include, but are not limited to a home button, a volume button, a start button, and a lock button.

The sensor component 914 includes one or more sensors for providing various aspects of status assessment for the device 900. For example, the sensor component 914 may detect the on/off states of the device 900, and a relative positioning of components. For example, the components are the display and keypad of the device 900. The sensor component 914 may further detect a change of position of the device 900 or one component of the device 900, whether or not the user touches the device 900, a location or acceleration/deceleration of the device 900, and a temperature variation of the device 900. The sensor component 914 may also include a proximity sensor configured to detect the presence of nearby objects without any physical contact. The sensor component 914 may further include an optical sensor, such as a CMOS or CCD image sensor, used in imaging applications. In some embodiments, the sensor component 914 may further include an acceleration sensor, a gyroscope sensor, a magnetic sensor, a pressure sensor, or a temperature sensor.

The communication component 916 is configured to facilitate wired or wireless communication between the device 900 and other devices. The device 900 may access a wireless network based on communication standards, such as WiFi, 2G or 3G, 4G or 5G, or a combination of the WiFi, 2G or 3G, 4G or 5G. In an example, the communication component 916 receives broadcast signals or broadcast associated information from an external broadcast management system via a broadcast channel. In an example, the communication component 916 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the device 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the above method.

In an example, a non-transitory computer-readable storage medium including instructions is further provided, such as a memory 904 including instructions executable by the processor 920 of the device 900 to complete the above method. For example, the non-transitory computer-readable storage medium may be an ROM, a random access memory (RAM), a CD-ROM, a magnetic tape, a floppy disk, an optical data storage device, etc.

According to a first aspect of an embodiment of the present disclosure, there is provided an image processing method, the method including:
   obtaining a compressed image of a current image, where resolution of the current image is greater than that of the compressed image;
   cropping out at least one composition preview image based on the compressed image; and
   cropping, in response to selecting a target composition image from said at least one composition preview image displayed, the current image based on a cropping range indicated by the target composition image In some embodiments, the method further includes:
   executing, in response to the current image meeting an image processing condition, an operation of obtaining the compressed image of the current image;
   the current image meeting the image processing condition includes at least one of the following:
   detecting an instruction for shooting the current image; and
   detecting a trigger operation for a preset composition function entrance, where the preset composition function entrance is located at a large image browsing page of the current image in a photo album application.

In some embodiments, the cropping out at least one composition preview image based on the compressed image includes:
   determining a target body image type in the compressed image;
   determining, based on a correspondence between a pre-constructed body image type and a composition rule, a target composition rule corresponding to the target body image type; and
   obtaining at least one composition preview image by cropping the compressed image based on the target composition rule.

In some embodiments, the determining a target body image type in the compressed image includes:
   recognizing the target body image type in the compressed image based on a preset image recognition algorithm; and/or
   determining the target body image type in the compressed image based on pre-obtained label information of the current image, where the pre-obtained label information includes at least one of a face detection result of the current image and an artificial intelligence scenario detection result.

In some embodiments, the body image type includes a portrait type and a non-portrait type;
   the portrait type further includes a portrait subtype, wherein the portrait subtype is at least one of: single-person, double-person, or multi-person; and
   the non-portrait type further includes a non-portrait subtype, wherein the non-portrait subtype is at least one of: animals, plants, scenery, constructions, or food.

In some embodiments, the target composition rule includes at least one of the following:
   a preset image scale of the composition preview image;
   a distribution principle of a body image in the composition preview image, where the distribution principle includes at least one of the following: a distribution principle based on an image median line, a distribution principle based on an image trisection line, a distribution principle based on a preset image quality point, a distribution principle based on a preset image inner frame region, and a principle for setting an edge or an outer frame around the body image;
   a cropping circumvention principle of the body image in the composition preview image, where the cropping circumvention principle includes circumventing at least one of a face, four limbs, and a specific joint of a portrait and/or a pet when cropping an edge of the image; and
   an inclination angle correction principle of the body image in the composition preview image.

In some embodiments, the cropping out at least one composition preview image based on the compressed image includes:
   obtaining the at least one composition preview image by inputting the compressed image to a pre-trained composition preview image generation model.

In some embodiments, the method further includes training the composition preview image generation model based on the following manners:
   obtaining a plurality of sample images of different body image types;
   obtaining at least one sample composition preview image of each of the sample images by cropping each of the sample images based on a composition rule corresponding to each body image type;
   establishing a sample image database based on each of the sample images and the at least one sample composition preview image; and
   obtaining a trained composition preview image generation model by training a pre-constructed composition preview image generation model based on the sample image database, where the composition preview image generation model uses a neural network model based on deep learning.

According to a second aspect of an embodiment of the present disclosure, there is provided an image processing apparatus, the apparatus including:
   a compressed image obtaining module, configured to obtain a compressed image of a current image, where resolution of the current image is greater than that of the compressed image;
   a preview image cropping module, configured to crop out at least one composition preview image based on the compressed image; and a current image cropping module, configured to crop, in response to selecting a target composition image from said at least one composition preview image displayed, the current image based on a cropping range indicated by the target composition image.

In some embodiments, the compressed image obtaining module is further configured to execute, in response to the current image meeting an image processing condition, an operation of obtaining the compressed image of the current image;

the current image meeting the image processing condition includes at least one of the following:

detecting an instruction for shooting the current image; and detecting a trigger operation for a preset composition function entrance, where the preset composition function entrance is located at a large image browsing page of the current image in a photo album application.

In some embodiments, the preview image cropping module includes:

a body type determination unit, configured to determine a target body image type in the compressed image;

a composition rule determination unit, configured to determine, based on a correspondence between a pre-constructed body image type and a composition rule, a target composition rule corresponding to the target body image type; and a preview image cropping unit, configured to obtain at least one composition preview image by cropping the compressed image based on the target composition rule.

In some embodiments, the body type determination unit is further configured to:

recognizing the target body image type in the compressed image based on a preset image recognition algorithm; and/or determining the target body image type in the compressed image based on pre-obtained label information of the current image, where the pre-obtained label information includes at least one of a face detection result of the current image and an artificial intelligence scenario detection result.

In some embodiments, the body image type includes a portrait type and a non-portrait type;

the portrait type further includes a portrait subtype, wherein the portrait subtype is at least one of: single-person, double-person, or multi-person; and the non-portrait type further includes a non-portrait subtype, wherein the non-portrait subtype is at least one of: animals, plants, scenery, constructions, or food.

In some embodiments, the target composition rule includes at least one of the following:

a preset image scale of the composition preview image;

a distribution principle of a body image in the composition preview image, where the distribution principle includes at least one of the following: a distribution principle based on an image median line, a distribution principle based on an image trisection line, a distribution principle based on a preset image quality point, a distribution principle based on a preset image inner frame region, and a principle for setting an edge or an outer frame around the body image;

a cropping circumvention principle of the body image in the composition preview image, where the cropping circumvention principle includes circumventing at least one of a face, four limbs, and a specific joint of a portrait and/or a pet when cropping an edge of the image; and an inclination angle correction principle of the body image in the composition preview image.

In some embodiments, the preview image cropping module is further configured to obtain the at least one composition preview image by inputting the compressed image to a pre-trained composition preview image generation model.

In some embodiments, the apparatus further includes a model training module; and the model training module includes:

a sample image obtaining unit, configured to obtain a plurality of sample images of different body image types;

a sample image cropping unit, configured to obtain at least one sample composition preview image of each of the sample images by cropping each of the sample images based on a composition rule corresponding to each body image type;

a sample image library establishment unit, configured to establish a sample image database based on each of the sample images and the at least one sample composition preview image; and a model training unit, configured to obtain a trained composition preview image generation model by training a pre-constructed composition preview image generation model based on the sample image database, where the composition preview image generation model uses a neural network model based on deep learning.

According to a third aspect of an embodiment of the present disclosure, there is provided an electronic device, the electronic device including:

a processor, and a memory configured to store a computer program;

where when executing the computer program, the processor is configured to implement:

obtaining a compressed image of a current image, where resolution of the current image is greater than that of the compressed image;

cropping out at least one composition preview image based on the compressed image; and cropping, in response to selecting a target composition image from said at least one composition preview image displayed, the current image based on a cropping range indicated by the target composition image.

According to a fourth aspect of an embodiment of the present disclosure, there is provided a non-transitory computer-readable storage medium storing a computer program, where when executed by a processor, the program implements:

obtaining a compressed image of a current image, where resolution of the current image is greater than that of the compressed image;

cropping out at least one composition preview image based on the compressed image; and cropping, in response to selecting a target composition image from said at least one composition preview image displayed, the current image based on a cropping range indicated by the target composition image.

The technical solutions provided by the embodiments of the present disclosure may include the following beneficial effects:

according to the present disclosure, a compressed image of a current image is obtained, where resolution of the current image is greater than that of the compressed image, and at least one composition preview image is cropped out based on the compressed image, such that in response to selecting a target composition image from the displayed at least one composition preview image, the current image is cropped based on a cropping range of the target composition image, which may implement automatic cropping of the current image, save manpower and time of a user, and improve image processing efficiency. The at least one composition preview image is displayed for the user to select the target composition image, such that it may be ensured that a composition manner of the selected target composition image conforms to the demands of the user. A cropping preview image of the compressed image of the current image is obtained to be displayed for the user, and the current image is cropped after the user selects the target composition image, such that a system memory for performing an image processing algorithm of the embodiments may be saved, so as to lower demands for system performance.

Those skilled in the art would readily conceive of other embodiments of the present disclosure after considering the specification and practicing the disclosure herein. The present disclosure is intended to cover any variations, uses or adaptive changes of the present disclosure. These variations, uses or adaptive changes follow the general principle of the present disclosure and include common general knowledge or conventional technical means in the technical field that are not disclosed in the present disclosure. The description and the embodiments are merely regarded as exemplary, and the real scope and spirit of the present disclosure are pointed out by the following claims.

It should be understood that the present disclosure is not limited to the precise structure described above and shown in the drawings, and various modifications and changes can be made without departing from its scope. The scope of the present disclosure is only limited by the appended claims.

What is claimed is:

1. An image processing method, comprising:
    obtaining a compressed image of a current image, wherein resolution of the current image is greater than that of the compressed image;
    cropping out at least one composition preview image based on the compressed image; and
    cropping, in response to selecting a target composition image from said at least one composition preview image displayed, the current image based on a cropping range indicated by the target composition image;
    wherein cropping out at least one composition preview image based on the compressed image comprises:
        determining a target body image type in the compressed image;
        determining, based on a correspondence between a pre-constructed body image type and a composition rule, a target composition rule corresponding to the target body image type; and
        obtaining at least one composition preview image by cropping the compressed image based on the target composition rule;
    wherein the target composition rule comprises at least one of:
        a distribution principle of a body image in the composition preview image, wherein the distribution principle comprises at least one of: a distribution principle based on an image median line, a distribution principle based on an image trisection line, a distribution principle based on a preset image quality point, a distribution principle based on a preset image inner frame region, or a principle for setting an edge or an outer frame around the body image;
        a cropping circumvention principle of the body image in the composition preview image, wherein the cropping circumvention principle comprises circumventing at least one of a face, four limbs, and a specific joint of a portrait, and a face, four limbs, and a specific joint of a pet when cropping an edge of the body image; or
        an inclination angle correction principle of the body image in the composition preview image.

2. The image processing method according to claim 1, further comprises:
    executing, in response to the current image meeting an image processing condition, an operation of obtaining the compressed image of the current image;
    the current image meeting the image processing condition comprises at least one of:
        detecting an instruction for shooting the current image; or
        detecting a trigger operation for a preset composition function entrance, wherein the preset composition function entrance is located at a large image browsing page of the current image in a photo album application.

3. The image processing method according to claim 1, wherein the determining a target body image type in the compressed image comprises:
    recognizing the target body image type in the compressed image based on a preset image recognition algorithm.

4. The image processing method according to claim 1, wherein the determining a target body image type in the compressed image comprises:
    determining the target body image type in the compressed image based on pre-obtained label information of the current image, wherein the pre-obtained label information comprises at least one of a face detection result of the current image and an artificial intelligence scenario detection result.

5. The image processing method according to claim 1, wherein the target body image type comprises a portrait type and a non-portrait type;
    the portrait type further comprises a portrait subtype, wherein the portrait subtype is at least one of: single-person, double-person, or multi-person; and
    the non-portrait type further comprises a non-portrait subtype, wherein the non-portrait subtype at least one of: animals, plants, scenery, constructions, or food.

6. The image processing method according to claim 1, wherein the target composition rule further comprises:
    a preset image scale of the composition preview image.

7. The image processing method according to claim 1, wherein the cropping out at least one composition preview image based on the compressed image comprises:
    obtaining the at least one composition preview image by inputting the compressed image to a pre-trained composition preview image generation model.

8. The image processing method according to claim 7, further comprising training a composition preview image generation model to form the pre-trained composition preview image generation model based on:
    obtaining a plurality of sample images of different body image types;
    obtaining at least one sample composition preview image of each of the plurality of sample images by cropping each of the plurality of sample images based on a composition rule corresponding to each body image type;

establishing a sample image database based on each of the plurality of sample images and the at least one sample composition preview image; and obtaining a trained composition preview image generation model by training a pre-constructed composition preview image generation model based on the sample image database, wherein the composition preview image generation model uses a neural network model based on deep learning.

9. The image processing method according to claim 1, wherein the preset image quality point is at least one of a focus of the image median line or a focus of the image trisection line, and the preset image inner frame region is a minimum wrapped rectangle of the preset image quality point.

10. An electronic device, comprising:

a processor, and a memory configured to store a computer program;

wherein when executing the computer program, the processor is configured to implement:

obtaining a compressed image of a current image, wherein resolution of the current image is greater than that of the compressed image;

cropping out at least one composition preview image based on the compressed image; and cropping, in response to selecting a target composition image from said at least one composition preview image displayed, the current image based on a cropping range indicated by the target composition image;

wherein cropping out at least one composition preview image based on the compressed image comprises:

determining a target body image type in the compressed image;

determining, based on a correspondence between a pre-constructed body image type and a composition rule, a target composition rule corresponding to the target body image type; and obtaining at least one composition preview image by cropping the compressed image based on the target composition rule;

wherein the target composition rule comprises at least one of:

a distribution principle of a body image in the composition preview image, wherein the distribution principle comprises at least one of: a distribution principle based on an image median line, a distribution principle based on an image trisection line, a distribution principle based on a preset image quality point, a distribution principle based on a preset image inner frame region, or a principle for setting an edge or an outer frame around the body image;

a cropping circumvention principle of the body image in the composition preview image, wherein the cropping circumvention principle comprises circumventing at least one of a face, four limbs, and a specific joint of a portrait, and a face, four limbs, and a specific joint of a pet when cropping an edge of the body image; or an inclination angle correction principle of the body image in the composition preview image.

11. The electronic device according to claim 10, wherein when executing the computer program, the processor is further configured to implement:

executing, in response to the current image meeting an image processing condition, an operation of obtaining the compressed image of the current image;

the current image meeting the image processing condition comprises at least one of:

detecting an instruction for shooting the current image; or detecting a trigger operation for a preset composition function entrance, wherein the preset composition function entrance is located at a large image browsing page of the current image in a photo album application.

12. The electronic device according to claim 10, wherein when executing the computer program, the processor is further configured to implement:

recognizing the target body image type in the compressed image based on a preset image recognition algorithm.

13. The electronic device according to claim 10, wherein when executing the computer program, the processor is further configured to implement:

determining the target body image type in the compressed image based on pre-obtained label information of the current image, wherein the pre-obtained label information comprises at least one of a face detection result of the current image and an artificial intelligence scenario detection result.

14. The electronic device according to claim 10, wherein the target body image type comprises a portrait type and a non-portrait type;

the portrait type further comprises a portrait subtype, wherein the portrait subtype is at least one of: single-person, double-person, or multi-person; and the non-portrait type further comprises a non-portrait subtype, wherein the non-portrait subtype is at least one of:

animals, plants, scenery, constructions, or food.

15. The electronic device according to claim 10, wherein the target composition rule further comprises:

a preset image scale of the composition preview image.

16. The electronic device according to claim 10, wherein when executing the computer program, the processor is further configured to implement:

obtaining the at least one composition preview image by inputting the compressed image to a pre-trained composition preview image generation model.

17. The electronic device according to claim 16, wherein when executing the computer program, the processor is further configured to implement:

obtaining a plurality of sample images of different body image types;

obtaining at least one sample composition preview image of each of the plurality of sample images by cropping each of the plurality of sample images based on a composition rule corresponding to each body image type;

establishing a sample image database based on each of the plurality of sample images and the at least one sample composition preview image; and obtaining a trained composition preview image generation model by training a pre- constructed composition preview image generation model based on the sample image database, wherein the pre-constructed composition preview image generation model uses a neural network model based on deep learning.

18. A non-transitory computer-readable storage medium storing a computer program, the computer program when executed by a processor cause the processor to execute a method comprising:
- obtaining a compressed image of a current image, wherein resolution of the current image is greater than that of the compressed image;
- cropping out at least one composition preview image based on the compressed image; and
- cropping, in response to selecting a target composition image from said at least one composition preview image displayed, the current image based on a cropping range indicated by the target composition image;
- wherein cropping out at least one composition preview image based on the compressed image comprises:
  - determining a target body image type in the compressed image;
  - determining, based on a correspondence between a pre-constructed body image type and a composition rule, a target composition rule corresponding to the target body image type; and
  - obtaining at least one composition preview image by cropping the compressed image based on the target composition rule;
- wherein the target composition rule comprises at least one of:
  - a distribution principle of a body image in the composition preview image, wherein the distribution principle comprises at least one of: a distribution principle based on an image median line, a distribution principle based on an image trisection line, a distribution principle based on a preset image quality point, a distribution principle based on a preset image inner frame region, or a principle for setting an edge or an outer frame around the body image;
  - a cropping circumvention principle of the body image in the composition preview image, wherein the cropping circumvention principle comprises circumventing at least one of a face, four limbs, and a specific joint of a portrait, and a face, four limbs, and a specific joint of a pet when cropping an edge of the body image; or
  - an inclination angle correction principle of the body image in the composition preview image.

19. The non-transitory computer-readable storage medium according to claim 18, wherein the method further comprises:
- executing, in response to the current image meeting an image processing condition, an operation of obtaining the compressed image of the current image;
- the current image meeting the image processing condition comprises at least one of:
  - detecting an instruction for shooting the current image; or
  - detecting a trigger operation for a preset composition function entrance, wherein the preset composition function entrance is located at a large image browsing page of the current image in a photo album application.

\* \* \* \* \*